(12) United States Patent
Gubler (10) Patent No.: US 8,910,578 B2
(45) Date of Patent: Dec. 16, 2014

(54) AERIAL CABLE CAR SYSTEM HAVING TRANSPORTATION OPERATING EQUIPMENT FOR PASSENGER AND/OR FREIGHT TRANSPORT

(75) Inventor: Daniel Gubler, Brittnau (CH)

(73) Assignee: CWA Constructions SA, Olten (CH)

( * ) Notice: Subject to any disclaimer, the term of this patent is extended or adjusted under 35 U.S.C. 154(b) by 87 days.

(21) Appl. No.: 13/383,117

(22) PCT Filed: Jul. 1, 2010

(86) PCT No.: PCT/EP2010/059409
§ 371 (c)(1),
(2), (4) Date: Jan. 9, 2012

(87) PCT Pub. No.: WO2011/003812
PCT Pub. Date: Jan. 13, 2011

(65) Prior Publication Data
US 2012/0103225 A1 May 3, 2012

(30) Foreign Application Priority Data

Jul. 8, 2009 (CH) .................................... 1057/09
Jun. 25, 2010 (WO) ................ PCT/EP2010/059096

(51) Int. Cl.
*B61B 12/00* (2006.01)
*B61B 3/00* (2006.01)
*B60L 5/00* (2006.01)
*H01G 9/00* (2006.01)

(52) U.S. Cl.
CPC .............. *B61B 12/002* (2013.01); *H01G 9/155* (2013.01); *Y02T 30/30* (2013.01)
USPC ....................... 104/173.1; 105/148; 191/45 R (58) Field of Classification Search
USPC ................. 104/87, 112, 113, 173.1; 105/148; 191/2, 22 R, 45 R–47
See application file for complete search history.

(56) References Cited

U.S. PATENT DOCUMENTS

| 5,416,702 A | 5/1995 | Kitagawa et al. |
| 7,389,729 B2 * | 6/2008 | Hinteregger ............... 104/173.1 |
| 2006/0060104 A1 | 3/2006 | Hinteregger |
| 2008/0282928 A1 | 11/2008 | Flom |

FOREIGN PATENT DOCUMENTS

| DE | 39 36 638 | 3/1991 |
| DE | 197 24 712 | 12/1998 |

(Continued)

OTHER PUBLICATIONS

International Search Report issued on Feb. 24, 2011 in PCT/EP10/059409 filed on Jul. 1, 2010.

*Primary Examiner* — R. J. McCarry, Jr.
(74) *Attorney, Agent, or Firm* — Oblon, Spivak, McClelland, Maier & Neustadt, L.L.P.

(57) ABSTRACT

An aerial cable car system including transportation operating equipment for passenger and/or freight transport, wherein electrical consumers are connected for operation thereof to a rechargeable electrical energy store of a transportation operating equipment by a respective power circuit. The transportation operating equipment includes an operating control device connected to measuring devices for dynamically capturing measurement values based on available quantity of energy in the energy store. The operating control device includes a storage module having at least one stored measurement control value and an associated control parameter. The operating control device includes a filter module comparing a captured measurement value to the at least one stored measurement control value and reading out corresponding stored control parameter, based on which power circuits can be selectively coupled or decoupled to the energy store by the operating control device. Electrical consumers in transportation operating equipment can be fed without interruption by the energy store, even during travel.

14 Claims, 5 Drawing Sheets

(56) References Cited

FOREIGN PATENT DOCUMENTS

| EP | 0 968 873 | 1/2000 |
| EP | 1 920 988 A1 | 5/2008 |
| FR | 2 934 833 | 2/2010 |
| JP | 9-93705 | 4/1997 |
| WO | 2004 064222 | 7/2004 |
| WO | WO 2004/080776 A1 | 9/2004 |

* cited by examiner

AERIAL CABLE CAR SYSTEM HAVING TRANSPORTATION OPERATING EQUIPMENT FOR PASSENGER AND/OR FREIGHT TRANSPORT

The invention relates to an aerial cable car system having transportation operating equipment for passenger and/or freight transport according to the preamble of independent claim 1.

DESCRIPTION

The prior art discloses aerial cable car systems having transportation operating equipment such as, for example, aerial cable car cabins or chair lifts, and wherein the transportation operating equipment is supplied with electrical power during a stop of the same inside a station of the aerial cable car system for the purpose of, for example, heating the transportation operating equipment. An electric contact is established to this end between the transportation operating equipment and a corresponding energy supply at the station by means of a contact device. Disadvantageously, with this apparatus heating is only possible during a dwelling period of the aerial cable car system at a station, meaning heating is not ensured for the entire length of the transport path.

Also known in the art are aerial cable car systems, in particular shuttle tramways, revolving cable railways and funicular cable cars having cabins in which heavy lead-acid batteries are used for temporarily or completely battery-powered operation of electrical consumers with emergency or safety functions, which are used, for example, in mountain information devices.

A substantial disadvantage of the lead-acid batteries or lead-acid storage batteries is their short cycle life. Another disadvantage is that lead-acid batteries need to be fully charged in certain intervals; otherwise the active plates of an accumulator become sulfated and thereby destroyed. This full-charge process is time-consuming and may take several hours. Furthermore, lead-acid batteries require a temperature range of ca. −18° C. to +30° C. for their flawless functioning. If the accumulators are operated outside of this temperature range, loss of performance, steam formation or even destruction of the battery may result. In transportation operating equipment, especially in closed cable car cabins, internal temperatures of up to 70° C. are possible, meaning lead-acid storage batteries must be protected against heat which involves great complexity. A major disadvantage of conventional lead-acid storage batteries is their enormous weight which makes them unsuitable as a supply source for feeding electrical accessories in cabins of cabin cable cars. Since lead-acid storage batteries cannot be loaded quickly, it is not possible to achieve a sufficient charge while they traverse a station. This means that all energy that is to be available throughout a day of operation must be taken along. Although newer-generation storage battery types are capable of a quick-charge process, their cycle life is not adequate for running a continuous-operation cable car system. The cycle stability of a storage battery is a measure of how many times a given storage battery can be charged and discharged.

EP 1920988 A1 discloses a chair lift having a chair with a safety device, and wherein the safety device can be electro-pneumatically released in the area of the chair lift stations in that during the entry and/or exit to and from a station an electrical power circuit is temporarily enabled in order to supply an electro-mechanical valve of the safety device in the area of the station with current. This power supply is disabled outside of the station.

US 2008282928 discloses a heating system for passengers of a chair of a chair lift, and wherein the chair includes a safety bar that can be pulled down, and wherein an energy source is connected with the chair, and wherein at least one source of heat is electrically connected with the energy source, and wherein the source of heat is disposed on the safety bar.

JP 9093705 A discloses an aerial cable car system with aerial cable car cabins comprising a battery for supplying, for example, one radio receiver respectively, and wherein contact devices are available at the stations of the aerial cable car system for connecting a charging station with the battery for the purpose of charging the battery by means of a charging station, and wherein the contact devices can be cleaned of dirt by means of a liquid stream and of ice by means of a heating device, and wherein this is to result in improved battery charging action.

DE 19724712 A1 relates to an electro-chemical capacitor as well as its use, in particular for passenger cars in road traffic, for example in combination with polymer-electrolyte-membrane fuel cells for electrical traction.

WO 2004080776 A1 discloses a method for heating a cushion of a seat and/or back rest of a chair of a chair lift system as well as a chair suited for that purpose, and wherein electrical heating occurs by means of a power source of a station while a chair is inside a station.

Therefore, it is the object of the present invention to propose an aerial cable car system having transportation operating equipment, for example aerial cable car cabins, that manages and optimizes stored energy of a rechargeable energy store of a transportation operating equipment for powering electrical consumers during the operation of transportation operating equipment efficiently, economically and in compliance with safety requirements.

The object according to the invention is achieved specifically by providing an aerial cable car system with transportation operating equipment for passenger and/or freight transport, and wherein electrical consumers are connected for the operation thereof to a rechargeable electrical energy store of a transportation operating equipment by means of one each of a plurality of the power circuits, and wherein the transportation operating equipment comprises an operating control device connected to measuring devices for dynamically capturing measurement values based on the available quantity of energy in the energy store, and wherein the operating control device comprises a storage module having at least one stored measurement control value and an associated control parameter, and wherein the control operating control device includes a filter module for comparing a captured measurement value to the at least one stored measurement control value and for reading out and/or selecting the corresponding stored control parameter based upon which power circuits can be selectively coupled to the energy store or selectively decoupled from the same by means of the operating control device.

One of the advantages of the invention consists in being able to operate electrical consumers of transportation operating equipment without interruption while being at the station as well as while travelling between stations. Electrical consumers are typically light sources such as, for example, halogen lights or LEDs, heating and/or cooling installations for the climate control of the cabin, audio and/or video means, ventilation systems, communications means operating via radio, WLAN, Bluetooth, etc. for unidirectionalor bidirectional communication. Electrical consumers can, for example, also be consumers that are carried by a person such as, for example, MP3 players or mobile telephones. An energy store usually comprises a high-capacity capacitor that may have a capacity of several thousand Farads. The electrical voltage that drops after the charging of the capacitor (energy store) is converted, for example, to a useful voltage that is definable by the consumer, for example, by means of a DC/DC converter. Transportation operating equipment therein includes preferably a safety circuit and a further circuit for electrical consumers the purpose of which serves primarily the comfort of the transported persons. The transportation operating equipment is able to selectively decouple or couple, depending on the residual energy quantity of the energy store, the power circuits. A typical useful voltage is 24V. The DC/DC converter is configured in such a way that it is able to generate an output voltage of 24V even with a residual charging voltage of the capacitor of ca. 15V. The DC/DC converter can also be configured to be operated solely to a voltage of ca. 25V in order to have the remaining power of the capacitor in reserve for safety applications.

In one embodied variant of the invention at least one measurement control value and a corresponding control parameter can be associated with each power circuit for the purpose of prioritizing the coupling action, which can then be stored by means of the storage module so that based on the captured measurement values it is possible to selectively couple or decouple each power circuit by means of the operating control device with or from the energy store corresponding to its prioritization.

One of the advantages of the invention lies in the fact that power circuits can be assigned a weighting or priority, and wherein a power circuit can be selectively decoupled by means of the operating control device not only based on the available quantity of energy of the energy store but also based on the weighting and/or relevance of the corresponding power circuit. Safety-relevant consumers such as, for example, intercom systems or emergency lights are preferably connected to a high-priority safety power circuit that will remain coupled until such a time that the energy store is completely discharged. High priority would mean that such a power circuit having such high priority would remain coupled for a longer amount of time than a circuit having low priority. But the safety power circuit can also be uncoupled from the energy store when a minimum voltage is present at the energy store. The storage module is configured, for example, as an addressable reference table for storing measurement control values and correspondingly associated enabled power circuits. A prioritization of the power circuits is achieved at the same time with the association of active power circuits and/or of power circuits connected to the energy store. A classification of the power circuits according to priority is also understood as a prioritization.

A further object of the invention envisions efficiently feeding electrical energy to the rechargeable energy store during a stop of the transportation operating equipment at a station of the aerial cable car system. In another embodied variant of the invention this is achieved in that the aerial cable car system includes at least one charging station for electrically charging the rechargeable energy store of an aerial cable car cabin. At least one current consumer exists in a further embodied variant that is electrically connected with the energy store, and wherein the current consumer acts in conjunction with at least one contact means of a charging station for charging the energy store, and wherein the charging current of the charging station can be enabled or disabled by sensor means. Preferably, one contact or power rail, respectively, is envisioned per pole; meaning for direct current, one contact rail for the positive pole and one contact rail for the negative pole of the charging station. It is also possible to use several contact rails and correspondingly several current consumers per pole in order to increase the current strength during the charging process.

In general, a charging process of the energy store can be described such that the capacitor is usually charged with a charging voltage of ca. 40V to 48V, and wherein the current is initially great, for example in the range of several 1,000 A, and wherein the charging current diverges toward zero upon reaching full charge. The maximum charging current is limited depending on the used current consumer technology and can be parameterized at the charging station. Charging voltages in excess of 48V, for example 500V, are possible, in particular if the charging current is to be reduced. But increased protective measures may be necessary to protect against personal injury.

Another typical process for charging the at least one rechargeable energy store is described below: If the energy store has a double layer capacitor as a store, using a charging station with a defined charging current, charging occurs until the voltage that has been defined in advance is achieved at the capacitor. Any drop in voltage at the electrical conductors between the charging device and the capacitor is taken into account and compensated accordingly at the charging device by an increase in voltage. As soon as the predefined voltage is reached at the capacitor, the charging current drops toward zero or the charging current corresponds to the current that is drawn by the consumers of the transportation operating equipment.

The charging station of the aerial cable car system preferably includes a charge control means that controls the charging current and/or the charging voltage based on the residual quantity of energy of an energy store of a cable car cabin. The charge control means can also take into account the temperature of the cells of the capacitor in order to extend the service life of the capacitor while, at the same time, exhausting optimum capacity of the same. This can also be achieved by a charging station that takes into account the temperature or generally by lower charging voltages.

A further object also consists in proposing a cost-effective energy store having a low intrinsic weight, minimum construction size and long service life in order to optimize an economical energy supply of the electric consumers in transportation operating equipment.

This is achieved by a rechargeable energy store that comprises as least one double layer capacitor. In one embodied variant of the invention the energy store of the transportation operating equipment is configured as a double layer capacitor. One of the advantages of the invention consists in the fact that the double layer capacitor is able to achieve specific effective power>20 kW/kg and that it is characterized by its high level of cycle stability in excess of 500,000 deep charging and/or discharging cycles. Using an energy store with a double layer capacitor it is possible to realize short-term peak performances and/or continuous basic loads. In the transportation operating equipment that is designed, for example, as a revolving cable rail system, the cable car cabins are in continuous operation during typical operating times throughout the day, for example 17 hours, usually stopping at each station only for seconds or minutes t a time. A further advantage of the invention also consists in the fact that a double layer capacitor can be sufficiently charged during this brief dwelling time to supply power for the, for example, next several minutes of travel that it takes to reach the next cable car station in order to power the electrical consumers of the transportation operating equipment, and wherein the consumers are connected at least with one of the power circuits that is removable with the energy store.

In a further embodied variant of the invention the current consumer of the transportation operating equipment comprises horizontally and/or vertically movable sliding contacts. One of the advantages of the invention is that the sliding contacts, which are movably disposed on the transportation operating equipment, allow for a safe current transfer from the power rails, which are disposed in the stations, to the contacts even when the transportation operating equipment is being transported or moved.

In one embodied variant of the invention the current transfer is realized by an inductive power rail and/or inductive current consumer. One of the advantages of the invention consists in the fact that the charging current is achieved by a contactless operating current transfer means. This current transfer means is designed similarly to a transformer with a primary and secondary coil (transfer coil) for the transfer of alternating current. In the present case, the alternating current must be converted to direct current on the secondary side in order to charge the energy store. One advantage consists in the fact that the current transfer is flawless and independent of dirt and ice.

In one embodied variant of the invention the contact means of the charging station for the touchless inductive energy transfer includes on the primary side a transfer coil, and wherein the transportation operating equipment for the current transfer includes a transfer coil on the secondary side that acts in conjunction with the primary side. One of the advantages of the invention lies in the fact that the charging action of the rechargeable energy store of transportation operating equipment is touchless, meaning there is no sparking, as can be the case with current transfer options that involve contact.

In a further embodied variant of the invention the transportation operating equipment comprises protective means designated as a connecting means or a connecting device for the protection of the energy store during the charging process and/or handling of the transportation operating means, and wherein the protective means are designed as diodes and/or overvoltage arresters and/or fuse cut-outs.

In one embodied variant of the invention the contact means of the power supply means of a station is designed as a contact rail, and wherein the movable sliding contacts of the transportation operating equipment for the transfer of electrical energy engage with the contact rails. When charging the energy store, up to several 100 A current may flow for short periods of time, which is advantageously realized with the proposed contact means.

In another embodied variant of the invention the contact rail is disposed at least in some sections along a cable of the cable car system. Current consumption along the cable or in the area of the roller batteries at pylons is also advantageous because this way smaller capacitor capacities are needed for major electrical consumers; or major electrical consumers can be hooked up.

In a further embodied variant of the invention a charge control means is disposed between the current consumer and the electrical energy store for the controlled charging action of the energy store based on the temperature of the same. One of the advantages of the invention consists in the ability of the charge control means to control the charging voltage as a function of the temperature based on the temperature of the capacitor cells. Advantageously, this can serve to extend the service life of a capacitor while simultaneously taking advantage of the largest possible capacity of the same. This can also be achieved by means of a charging station that takes the temperature into account or generally by lower charging voltages.

To charge an electrical energy store of transportation operating equipment that is designed for conveying passengers and/or freight of a cable car system the electrical energy store of the cabin is preferably electrically charged during the at least temporary dwelling time of the transportation operating equipment inside a station of the cable car system. The charging process can also take place during the at least temporary dwelling time of the cable car cabin at a cable pylon, for example, while travelling past the same. To this end, the pylon is equipped with a charging and contacting means in order for the corresponding counter-contacts on the cable car cabin and/or its suspension to allow for charging action while travelling. Corresponding means for open- and/or closed-loop controlling of the charge are disposed on the transportation operating equipment and/or the charging station. Open- and/or closed-loop controlling action of this kind can optionally also be available inside a station or at a pylon. Electrically and/or mechanically decoupled charging means are disposed in order to charge the energy stores of several cable car cabins that are present inside a station of the cable car system. The length of the power rails is usually smaller than the minimum distance occurring between two pieces of transportation operating equipment inside a station. Decoupling of the power circuits is necessary because during the charging action of several double layer capacitors at a common charging station, the capacitors would equalize each other to the same voltage level, meaning that very high compensation currents may flow between the capacitors that can destroy the charging contacts as well as the lines between the current consumers and the energy store.

Transportation operating equipment: Cable car cabin, chair, vehicle of a funicular cable car and the like that is/are designed to receive passengers and/or freight transporting them from a starting point to a destination point.

Cable car system: Installation such as, for example, revolving rails, shuttle trams, funicular cable cars, monorail or shuttles designed for the spatial movement of transportation operating equipment, and wherein the one or several pieces of transporting operating equipment is/are pulled by means of one or several cables of the cable car system, suspended from the former or otherwise at least temporarily connected thereto.

Pylon: Distance means for supporting a rope, cable, etc., and wherein the pylon includes a pylon tip upon which are disposed rollers or wheels, in most instances as so-called roller batteries, that function as cable guides.

Consumers: Presently, in particular, electrical consumers, such as lamps, heaters, climate-control instruments, fans, monitors, audio and video conveying means for radio, WLAN, Bluetooth, etc.

Energy store: Double layer capacitors, lithium ion capacitor (LIC), batteries in the conventional sense, lead-acid batteries, NiMH, NiCd, LiMn, NaS and other storage means for temporarily holding and releasing electrical energy to electrical consumers.

Energy supply: Development of energy sources, energy conversion to variably usable energy carriers, energy transport to the consumers.

Double layer capacitor: Usually designed as a plate capacitor with electrodes having a very large surface area. Preferably used herein is activated charcoal by which it is possible to realize, in relation to the active mass of an electrode, capacities of up to 100 F/g. A conducting salt that is dissolved in aqueous or organic solvent is frequently used as electrolyte, which is located as a conducting liquid between the electrodes. When a voltage is applied, dissociated molecules of the electrolyte are deposited as cations and/or anions on the charcoal-coated surfaces of the electrodes at a distance of a few Angstrom thus creating the so-called double layer. A permeable membrane, called a separator, prevents in its capacity as a separating layer any shorts between the electrodes. The enormous surface area of the electrode translates into a very large capacity yield.

Contact means: Means for the electrical energy transfer from an energy source to an energy sink, and wherein the contact can be established at least temporarily. Preferably, a current consumer is routed across a current-carrying cable or a channel. During the current consumption the current consumer can be locally displaced therein. Presently understood as contact means of transportation operating equipment for transmitting current are also inductive power rails (primary side) for the contactfree transmission of an alternating current to a secondary side, for example a transformer coil, and wherein the secondary coil is disposed on the transportation operating equipment.

Charging means: Open- or closed-loop control for the controlled charging action of an energy store such as, for example, a double layer capacitor, and wherein particularly the charging current and the charging voltage are used as control parameters. The charging means or charging station provides the necessary charging voltage and charging current for the double layer capacitor. The charging means is also designated the charging device.

Charging voltage: This is the voltage at an energy store at which said store is charged.

Charging current: This is the current for charging an energy store of transportation operating equipment.

Embodied variants of the present invention will subsequently be described in an exemplary manner. The examples of the embodiments are further illustrated by the following enclosed figures.

Figure 1:
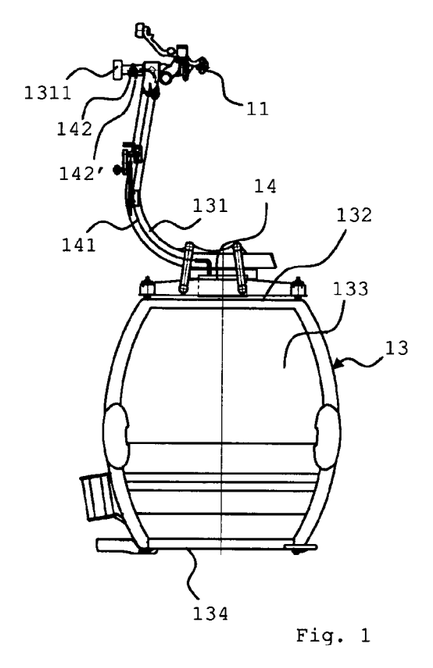
FIG. 1 shows a piece of transportation operating equipment that is designed as a cable car system.

FIG. 1 illustrates transportation operating equipment 13 that is designed as a cable car cabin of a cable car system 1. The transportation operating equipment serves for the transport of passengers and/or freight including an electrical energy store by which electrical consumers of the transportation operating equipment can be operated. The energy store comprises at least one rechargeable capacitor. Several capacitors can be available in order to increase the capacity of the energy store. Aside from a capacitor that is preferably configured as a double layer capacitor, the energy store can also comprise one or several lead-acid batteries, NiCd, NiMh, LiMn, lithium ion capacitor (LIC), NaS or comparable energy stores, and wherein their different properties can be combined by means of an open- and/or closed-loop charge control. The reference sign 141 designates the cabling or wiring of the current consumers 142 with the double layer capacitor 14.

Figure 2:
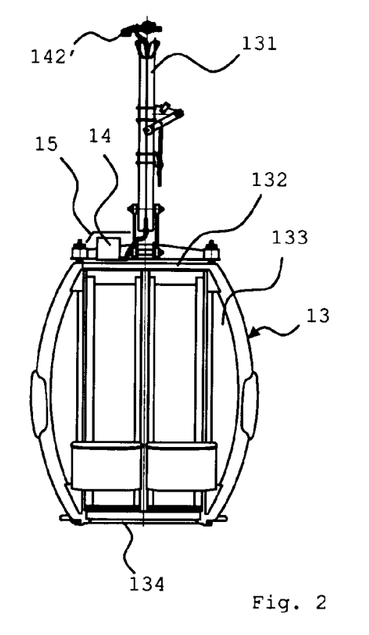
FIG. 2 shows a side view of the transportation operating equipment having a side, a floor and a roof as well as a suspension.

FIG. 2 illustrates a side view of the transportation operating equipment 13 having a side 133, a floor 134 and a roof 132 as well as a suspension 131. The energy store 14 is disposed and permanently connected in the roof area. This can be done, for example, on the suspension or on the roof. Reference sign 15 designates a sleeve, a sun roof or protective shielding. This shielding protects the energy store against an excessive heat-up due to irradiation by the rays of the sun, against rain, snow and other environmental effects.

Figure 3:
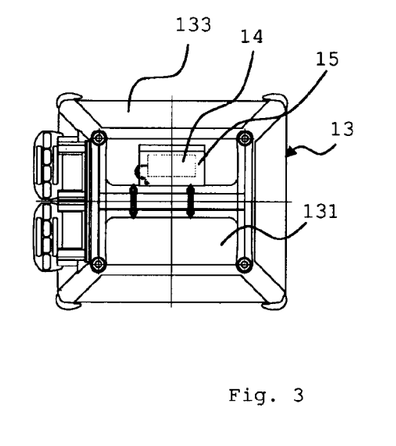
FIG. 3 shows a top view of the transportation operating equipment having sides and roof, and wherein a perforated line represents an energy store that is protected by a sun roof disposed above it.

FIG. 3 illustrates a top view of the transportation operating equipment 13 having the sides 133 and roof 131. The perforated line designates the energy store below the protective shielding 15.

Figure 4:
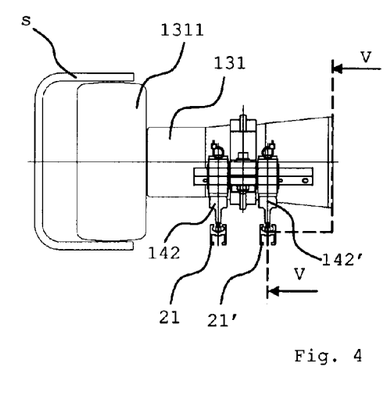
FIG. 4 shows a detail view of FIG. 1 in which a current consumer that is movably disposed on a suspension of the transportation operating equipment with contacts, and wherein said contacts are guided inside a respective indentation of the power rails.

FIG. 4 illustrates a detail view of FIG. 1 of a current consumer having the contacts 142, 142' and being movably disposed on a cable clamp of the suspension 131 of the transportation operating equipment, and wherein said contacts are pressed into a respective indentation of the power rails 21,21' by the application of a spring force. The cable clamp includes a roller 1311 that is configured herein as a U-shaped running rail s of a station and serves to convey the transportation operating equipment inside a station.

Figure 5:
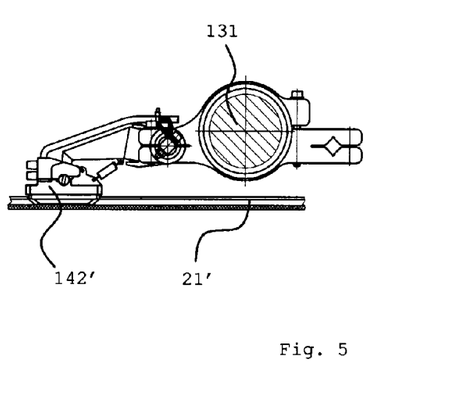
FIG. 5 shows a sectional representation along line V-V from FIG. 4.

FIG. 5 illustrates a sectional view along section line V-V from FIG. 4. This is why the power rail 21' is represented by way of a section. The sliding contact of the current consumer 142' transportation operating equipment is disposed on the cable clamp of the suspension 131 and movably supported.

Figure 6:
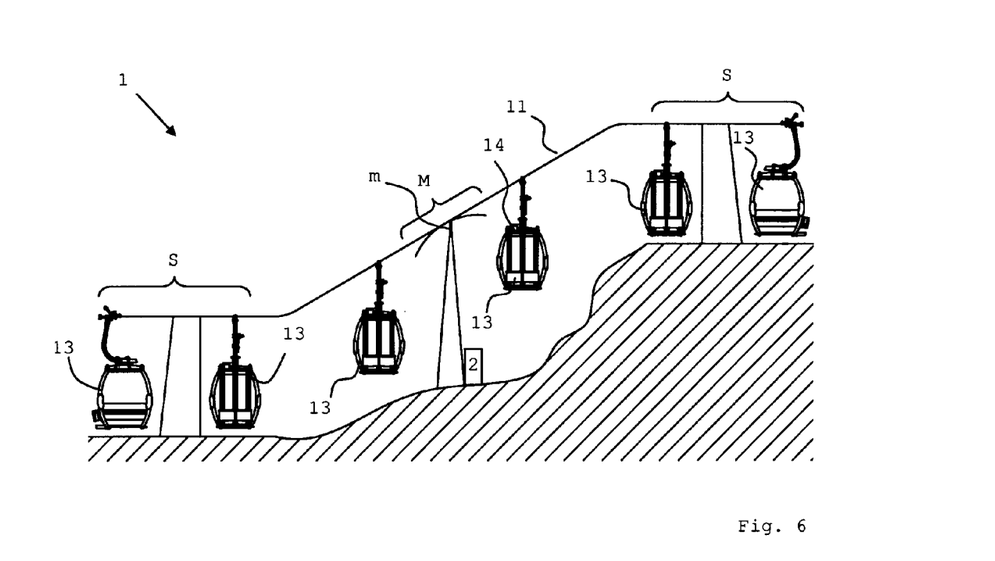
FIG. 6 shows a cable car system having a valley station and a mountain station and a support pylon with a pylon tip on which the cable is preferably routed by means of rollers.

FIG. 6 illustrates a typical cable car system having a valley station and a mountain station S as well as a support pylon with a pylon tip m supporting cable 11. It is possible to dispose contact means also in the area of the pylon tip that is fitted for the short-term charging of energy store 14 of a cable car cabin 13. A corresponding power supply means 2 for charging the energy store 14 is disposed at the corresponding pylons. The power supply means preferably transmits direct current and/or direct voltage to the energy store. In the area of the pylons the contact means can be designed in such a way that a so-called rod collector with contact roller, shear and stirrup or horse-shoe current consumer is disposed for each direct current contact on the transportation operating equipment 13. Touchless transfer of the charging current is also possible, for example by inductive current transfer.

Figure 7:
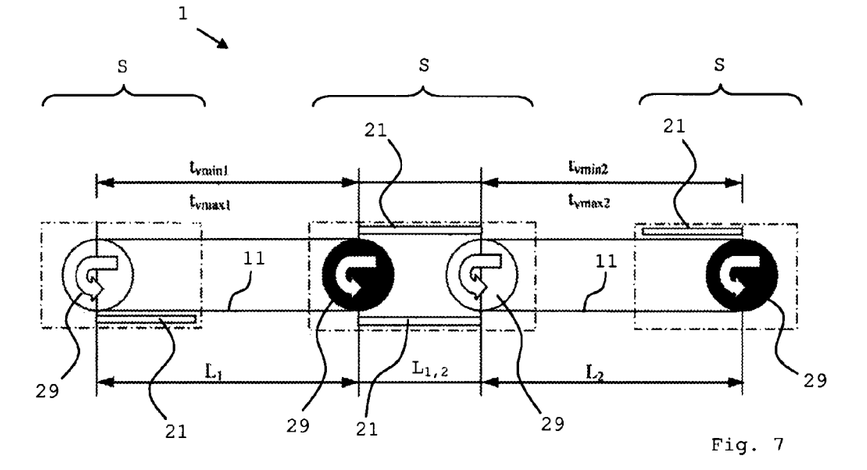
FIG. 7 shows a schematic representation of a cable car system 1 having three stations S comprising each at least one drive and/or freewheel 29 with the cable is disposed as revolving around the former.

FIG. 7 illustrates a schematic representation of a cable car system 1 having three stations S comprising each at least one drive and/or freewheel 29 around which the cable 11 is disposed in a revolving manner. The reference sign L1 shows the conveying length or length between a valley station and an intermediate station; the reference sign L2 designates the conveying length between the intermediate station and a mountain station. The stations S are depicted by a perforated line. The contact means that are designated by the reference sign 21 are located inside said stations. Each cable 11 is powered by the drive means with usually constant speed that is in the range of between $L_1/t_{vmin1}$ and $L_1/t_{vmax1}$ and/or $L_2/t_{vmin2}$ and $L_2/t_{vmax2}$. It is also possible to envision only one cable for the entire conveying length, meaning that there is one drive wheel and one or several freewheels. When dwelling inside or at the stations the transportation operating equipment moves approximately at a stepping speed, or it is brought to a halt for a short amount of time allowing passengers to safely board and de-board. During this phase it is possible to charge the energy store of the transportation operating equipment, and wherein the current consumers of the transportation operating equipment engage in the corresponding contact means, specifically the contact rails that are preferably designed as having a U-shape. At the intermediate station the contact rails can be disposed outside of the two wheels 29 across a length $L_{1,2}$. For shuttle rail cabins it is possible to charge the energy stores while the passengers board and de-board. Usually, this process takes several minutes. The charging rails therein are designed as very short having a length of 1 meter, for example.

Figure 8:
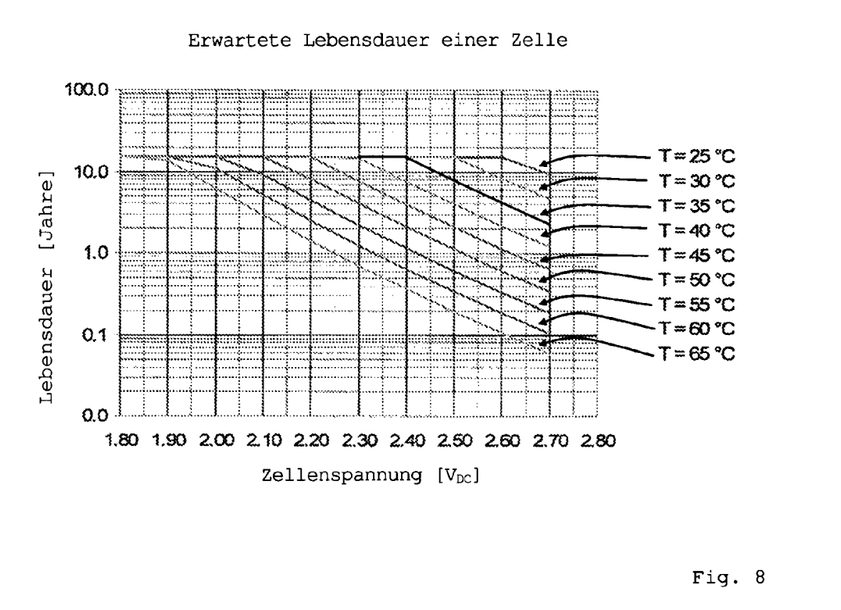
FIG. 8 shows in a diagram the approximately expected service life of a cell of a double layer capacitor as a function of the charging voltage and the operating temperature on the inside of the capacitor.

FIG. 8 illustrates in a diagram the expected service life of a cell of a double layer capacitor. It can be seen herein how the service life in years is functionally dependent on the cell voltage in $V_{DC}$ at a certain cell temperature in degrees C. A double layer capacitor that is typically used for the cable car system includes, for example, 18 cells resulting, with a typical cell voltage of 2.7V, in a voltage of 48.6V. If the goal is, for example, a service life of ten years, the inside temperature may not be substantially higher than 25 degree C. The double layer capacitor 14 is therefore protected against excessive heat by a shield 15. To achieve a maximum service life of a double layer capacitor that is suitable even for use in excessive heat such as, for example, in the summertime, the charging voltage in the charging means 2 is reduced such that a maximum service life of approximately 15 years can be reached due to a lower cell voltage of, for example, 2.2V and an internal temperature of, for example, a maximum of 45 degrees C. At this cell voltage and the same number of cells the charging voltage would be approximately 39.6V.

Figure 9:
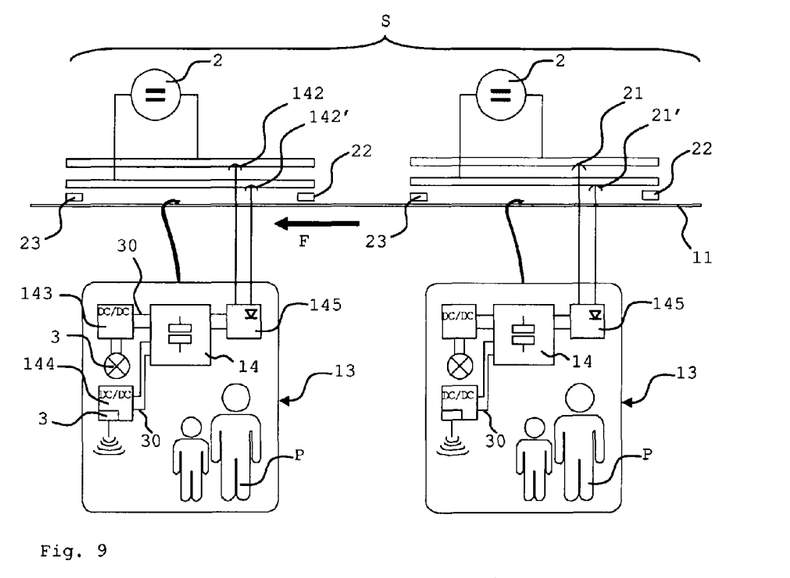
FIG. 9 shows a schematic view of two pieces of transportation operating equipment that are positioned inside a station, and wherein two charging means that are separated from each other are available.

FIG. 9 illustrates a schematic view of two pieces of transportation operating equipment 13 positioned inside a station S. Present therein are two charging means 2 that are separate of each other. The charging means are designed as direct current sources having a positive and a negative pole. One of these poles each is routed to a power rail 142, 142' that is represented herein in a simplified manner. Detection means or sensor means 22, 23 are preferably disposed in the area of the end ends of the power rails; they can be used to ascertain if the contacts 142,142' of the transportation operating equipment 13 that is being conveyed in the travel direction F have passed the sensors. The sensor means and/or signal generators are configured, for example, as proximity sensors or metal detectors, such as inductive proximity switches, whereby, for example, the cable clamp or the suspension and/or lifting tackle 131 of the transportation operating equipment 13 can be detected. The goal of this detection is, on the one hand, to determine if the contacts 142,142' are solidly in contact with the power rail and/or power rails 21,21' thus allowing even great currents to be transferred without sparking. Furthermore, the detection serves for providing a controlled start and/or activation as well as a controlled stop and/or deactivation of the charging process of the corresponding charging station 2. The travel direction of the cable car can be changed in certain operating instances, for example by backing the transportation operating equipment out of parking facility. The logic of the signal generator is changed in such an instance due to the change in the direction of travel. Using the sensor signal of the sensor means 23 while travelling backwards the charging process by the charging station is correspondingly started opposite the usual travelling direction F. The charging process is stopped while travelling backwards as soon as the transportation operating equipment 13 has been captured by the sensor means 22. The travel direction F therein is determined by a central control 19 of the cable car system 1. Sparks form, in particular, when a current consumer runs against a power rail that carries voltage or is decoupled from such a rail. For safety reasons the signal generators can be present in pairs providing redundancy. Based on the signal of the sensor means 22, the charging voltage and/or charging current is applied to the contacts 21,21' and/or interrupted and/or switched on or off based on the sensor means. With a redundancy of the signal generators, it is possible to ensure a switch-on or switch-off signal even if one signal generator fails. But any failure of the signal generator and/or sensor means 22,23 is recognized as an error at the charging station 2.

The reference sign 145 designates a connecting device with connecting contacts for connecting energy store 14 with the sliding contacts 142. Moreover, the energy store provides information data such as, for example, cell voltages, excess voltage, symmetry of multiple cells, excess temperature, etc., that can be read, and wherein a cable connection with the connection device 145 is provided for this purpose in order to read the information data, for example, by means of a data logger or a programmable logic controller. The connection device 145 comprises at least one reverse polarity protection such as, for example, a diode or thyristor. The connection device preferably includes an overvoltage arrester. Moreover, the connection device 145 usually includes at least one overcurrent fuse, for example, in the form of a fusible cut-out.

At least one DC-DC converter 143 is envisioned that provides based on an electric input voltage of approximately 15V to 48V a constant output voltage of 24V to feed the electrical consumers 3 that serve, for example, for entertaining passengers or enhancing the well-being of passengers (heater, cooling unit, ventilation, lighting, etc.). A further DC-DC converter 144 is proposed in order to feed the electrical consumers 3 that fulfill emergency functions and/or convey mountain-related information. This power circuit serves as a so-called safety power circuit. The DC-DC converter for the emergency function power circuit provides a constant output voltage of, for example, 24V until the complete discharge of the capacitor. In order to ensure that the emergency functions are operational until an almost complete discharge of the double layer capacitor has occurred, it is possible to prioritize the electrical consumers. Depending on the voltage at the capacitor, lights, heater and/or cooling for climate control, radio, etc. therein are sequentially switched off prematurely.

Figure 10:
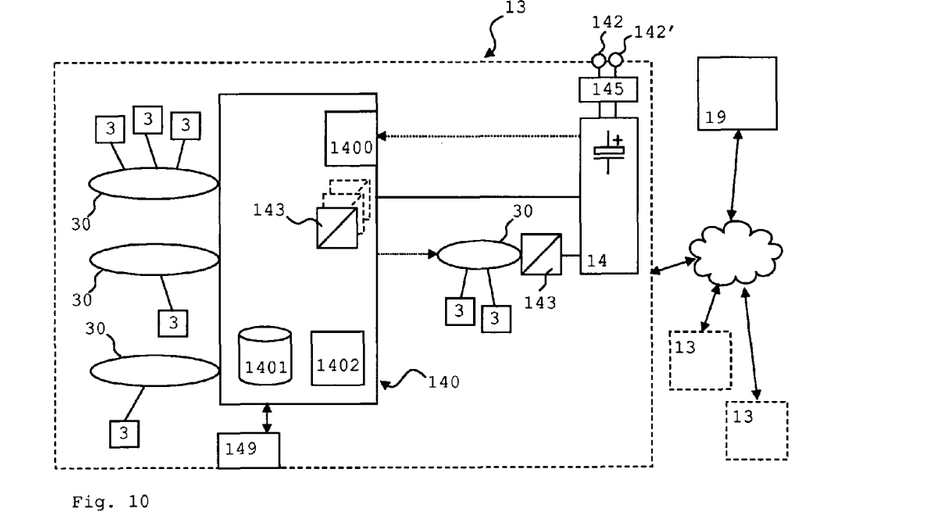
FIG. 10 shows a schematic block diagram of an energy store of the transportation operating equipment of the cable car system.

The operating control device 140 that is depicted in FIG. 10 can thus also be realized according to FIG. 9 in that one or several voltage converters such as, for example, DC-DC and/or DC-AC converters, with same and/or different input voltage are connected with the energy store 14. Depending on the available energy of the energy store 14, one voltage transformer after the other will stop operating because its input voltage drops below a necessary minimum operating value.

The functional units of the measurement instrument 1400, storage module 1401 and filter module 1402 of the operating control device are thus realized in the function of a voltage converter.

A power circuit 30 can be connected directly to the energy store. A power circuit 30 can be connected to a voltage connector that is directly connected with the energy store 14. It is possible to connect multiple energy stores with each other.

Instead of multiple DC-DC converters that are provided for one piece of transportation operating equipment, it is possible to provide a single DC-DC converter for the consumers. To ensure an efficient energy economy the electrical consumers of the travelling operating means 14 are prioritized, and whereby threshold values are defined with regard to the voltage of the energy store; when these are reached, the corresponding consumers are gradually switched off. The threshold values can be manually set via a potentiometer, and wherein the consumers are connected to different power circuits depending on their prioritization. But the threshold values can also be manually set by means of an interface, voltage-dependently, with a programmable logic controller (PLC), and wherein the consumers are connected to different outputs of the PLC depending on their prioritization. Even with minimum residual voltage it is thus possible to ensure that the safety-relevant consumers, such as intercom or emergency systems, are maintained in operation for as long as possible.

FIG. 10 shows in a schematic block diagram the energy supply of several electrical consumers 3 of transportation operating equipment 13 for the transport of passengers and/or freight of the cable car system 1 according to the invention.

Electrically operated consumers 3 are, for example, intercom devices, emergency calling devices and personal computers with monitors, audio amplifiers with loudspeakers, multimedia devices, communication means with, for example, WLAN access point, DC-DC converters for other voltages than 24V, LAN switch, PLC, cameras for inside and outside security surveillance, and wherein the latter can be network-capable, duplex operation module, cross-current fan, LED elements with light control, ultrasound sensor, emergency lighting and control module including charge control. Such consumers are connected with a rechargeable electrical energy store 14 of the transportation operating equipment 13, respectively via one of multiple power circuits. The transportation operating equipment 13 therein comprises an operating control device 140 that detects by means of measurement device 1400 the corresponding measurement values based on the available amount of energy of the energy store 14.

The operating control device 140 includes at least one voltage converter (DC-DC converter) 143 that converts the voltage of the energy store 14 that is available during operation into a constant output voltage. One or multiple power circuits can be connected with a DC-DC converter. This way, the consumers 3 can be grouped by power circuits. The operating control device 140 is able to selectively switch the power circuits 30, and thereby also the consumers 3, on and off based on the generated control parameters, which are also designated as operating control parameters. This allows for optimizing the available energy of the energy store 14.

FIG. 10 illustrates, moreover, a variant in which there is present a power circuit 30 having consumers 3 that is connected directly with the energy store 14 by means of a DC-DC converter 143. The operating control device 140 is designed in such a way as to be able to selectively switch the respective power circuit on and off even in this configuration, or to decouple the DC-DC converter from the energy store 14. This is realized, for example, by means of a controllable power switch.

Measurement values that can be captured are, for example, cell voltage, symmetry of the cells and/or their voltage, overvoltage or overtemperature. Power circuits 30 can be connectable with the energy store 14 by means of the operating control device 140 not only directly and/or indirectly. The operating control device 140 is and/or is designed, for example, as a programmable logic controller with load switches. The operating control device 140 can also be designed as a printed electrical circuit with adjustable measurement control values, for example by means of potentiometers. The filter module 1402 is designed to compare measurement values, preferably as comparator for comparing two electrical voltage values. The control values that is generated therein is used as a binary or analogous value by the operating control device 140 for selectively switching one or multiple power circuits on or off, preferably using a power switch. Each power circuit 30 can be associated with a switch-on voltage value. Each power circuit 30 can be associated with a switch-off value. The associations can be stored by the storage module. The coupling and decoupling of a power circuit can, moreover, be prioritized relative to other power circuits.

The operating control device 140 includes a storage module 1401 having at least one stored measurement control value. A measurement control value is, for example, a voltage value in volts that is stored as a threshold value. The operating control device 140 therein is for comparing a detected measurement value with at least one stored measurement control value. A filter module 1402 compares the dynamically captured measurement value with the measurement control values that can be read from the storage module 1401 and selects the associated control parameter. The control parameter can be, for example, 0 for switching off/separating/decoupling or 1 for switching on/connecting/coupling. If a measurement value is smaller than a certain stored threshold value and/or measurement control value, the operating control device selectively decouples at least one power circuit from the energy store 14.

The operating control device 140 includes several filter modules, and wherein each power circuit 30 has associated to it a corresponding filter module, and wherein each filter module is designed for comparing a measurement value with a definable measurement control value and for generating a corresponding control parameter based upon which the respective power circuit 30 is interrupted.

The operating control device 140 includes corresponding controllable separating and connecting power switches for the purpose of decoupling (separating) and/or coupling (connecting) of power circuits 30. They can be designed, for example, as relay or semi-conductor switches.

If the energy store 14 is charged by means of the charging station 2, the available quantity of energy of the energy store 14 increases. Using the measurement device 1400 of the operating control device 140, a current measurement value is dynamically captured based on the available quantity of energy of the energy store and compared with stored measurement control values. If the measurement value reaches or exceeds a certain measurement control value, the corresponding power circuit 30 is selectively connected by means of the operating control device 140 with the energy store 14.

Outside of the operating times, preferably, the transportation operating equipment 13 is parked at the cable car stations. Parking the transportation operating equipment is designated as storage in a garage, the taking into operation as removing from parking. In order to preserve the available residual energy of the energy store 14 of transportation operating equipment 13 as much as possible during parking, it is proposed that all power circuits 30 of the transportation operating equipment be temporarily interrupted from the energy store 14. To automate this process, it is possible to use sensor means. The transportation operating equipment 13 can include sensor means 149 by which it is possible to detect the distance of the cable car cabin relative to the floor, for example a distance sensor means that is designed as an ultrasound sensor or optical sensor. Die operating control device 140 can be configured therein to undertake, based on the distance values as detected by the distance sensor means, a comparison with a stored distance reference value in order to preferably decouple all power circuits after a definable period of time, for example after 15 minutes. This is especially helpful when parking cable car cabins at a cable car station S. The distance value can also be transmitted as a binary value from sensor means 149 to the operating control device 140, based upon which the power circuits 30 are decoupled from the energy store after a definable delay time of, for example, 15 minutes.

A signal from a door-end switch of transportation operating equipment can also be used as a sensor means 149 and can be combined with a time counter, whereby in the event of an open door for a time period of more than, for example, 15 minutes preferably all power circuits 30 of the transportation operating equipment 13 are decoupled from the energy store 14 by means of the operating control device 140.

The use of a global positioning system (GPS) is possible as a sensor means 149 for determining location-specific coordinate data. The coordinate data of a cable car station S therein are compared with corresponding place-specific coordinate data of a transportation operating equipment 13 by means of the operating control device 140, and all power circuits 30 are switched off precisely relative to their position in the area where they are parked, for example in the cable car station S.

For the purpose of optimizing the energy reserves of the energy stores 14 it is possible, by wire-connected or wireless transmission of control signals from a central control 19 of the cable car system 1, to transmit a control and/or switch-off signal to the respective operating control device 140 in order to decouple one, multiple or all power circuits 30 of transportation operating equipment 13 from the energy store 14, irrespective of its available residual energy and/or charging state. Preferably, this occurs by the wire-connected or wireless transmission of control signals of a central control device 19 of the cable car system to one or multiple pieces of transportation operating equipment 13.

The operating control device 140 is preferably permanently connected with the energy store 14 of transportation operating equipment 13 in order to selectively re-couple, in particular, the power circuits 30 with the energy store 14.

Figure 11:
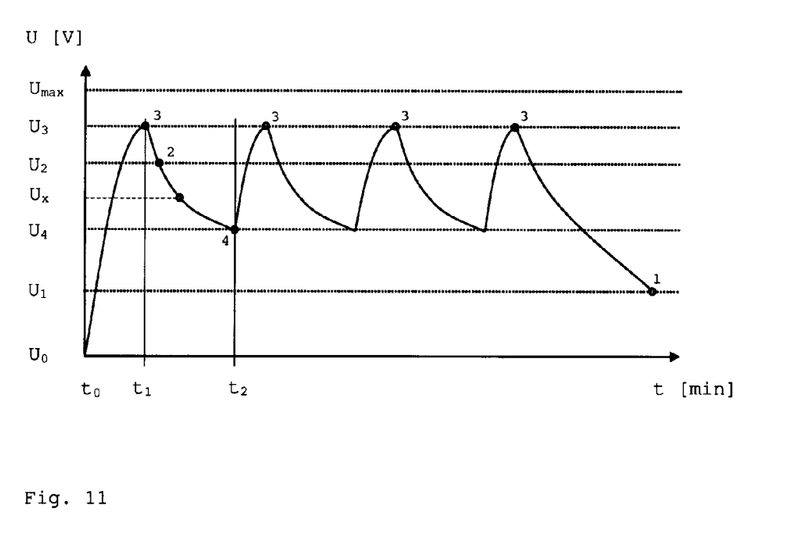
FIG. 11 shows a schematic diagram of the course of the charging voltage of an energy store of a piece of transportation operating equipment.

FIG. 11 illustrates a schematic—not drawn to scale—diagram of a typical charging and discharging cycle of an energy store of transportation operating equipment. Shown therein is on the vertical axis the charging voltage in volts of the energy store. The horizontal axis shows the time.

At voltage value $U_0$ the residual voltage at the energy store 14 is almost or completely zero. The energy store is discharged and must be recharged by a charging station 2 of the cable car system 1.

The voltage $U_1$ is presently designated as a switch-off voltage value at the energy store 14, and wherein upon reaching this value and/or going below the operating control device 140 switches the power circuits 30 are off and/or decouples or separates them from the energy store. The voltage value is captured by the measurement device 1400 and transmitted to the operating control device 140. Presently, the switch-off voltage is, for example, 15V. The voltage $U_1$ corresponds to a measurement control values that was stored by storage module 1401, and wherein the captured measurement value of the residual voltage of the energy store leads to the decoupling action of the corresponding power circuits by way of the operating control device.

$U_2$ designates a definable switch-on voltage value, which is also designated a start-up or limit voltage, and wherein only when this value is reached and/or exceeded, the operating control device 140 selectively couples power circuits 30 with the energy store 14. Depending on the charging state of the energy store 14, one or several passages of the transportation operating equipment 13 is/are necessary at the respective charging stations 2 of the cable car stations S. Presently, the start-up voltage is, for example, 38V.

Voltage $U_3$ designates the desired voltage of the energy store 14 to which the same is at least charged by the charging station 2. Presently, the desired voltage is, for example, 40V.

Voltage $U_4$ designates a voltage value at the energy store 14 that is usually reachable if the transportation operating equipment 13 reaches the cable car station S, meaning shortly before the charging process of the energy store by the charging station 2 begins.

$U_{max}$ designates the maximum voltage of the energy storage 14, which is in the present embodied variant 48V at the double layer capacitor.

$t_o$ designates the point in time at which the residual charging voltage of the energy store is zero or almost zero.

$t_1$ designates the point in time at which the charging voltage has reached a maximum value. This applies preferably when the transportation operating equipment 13 leaves the cable car station S.

$t_2$ designates the point in time at which the power transfer for the charging the energy store 14 of transportation operating equipment 13 is engaged. The dropping voltage course between times $t_1$ and $t_2$ shows the respective residual energy and/or residual voltage of an energy store.

The invention will be explained in further detail using the available voltage $U_x$ at the energy store 14, which is also designated as the actual voltage. The course of the voltage is dynamically captured by the measurement device 1400 of the operating control device 140 and transmitted as measurement value, for example $U_x$, to the filter module 1402. The storage module 1402 includes one or multiple addressable measurement control values, for example voltage values, with which are associated the corresponding control parameters. The filter module 1402 addresses the stored measurement control values and compares them with the captured measurement values. The measurement control values that are generated based on the measurement control values by the filter module disengage in the operating control device 140 a power circuit 30 or a consumer 3, as soon as a captured measurement value falls below a stored measurement control value. A control parameter can be defined as a switching signal. A control parameter can be defined as a switching signal that is associated to a power circuit and/or a consumer.

The designated voltage values are not limited to the present embodiment that is of an exemplary nature and in which the energy storage includes a double layer capacitor.

LIST OF THE REFERENCE SIGNS

1 Cable car system
11 Cable, conveying cable
13 Transportation operating equipment, cable car cabin, seat
131 Suspension, suspension with cable clamp 1311 Roller
132 Roof
133 Side
134 Floor
14 Energy store, double layer capacitor
140 Operating control device
1400 Measurement device
1401 Storage module
1402 Filter module
141 Cabling
142,142' Contact, sliding contact, current consumer
143 Converter, DC-DC converter
144 Converter for safety power circuit, DC-DC converter
145 Connection device
149 Sensor means
15 Cover, sleeve, protective shield
19 Central control, cable car control
2 Charging means, charging station, power supply means
21,21' Contact means, contact, power rail
22 Sensor means, detector
23 Sensor means, detector
29 Wheel, revolving wheel, drive wheel, trolley wheel
3 Consumer, end devices
30 Power circuit
F Direction of travel, transportation direction
L, $L_1$, $L_2$, .... Length
M Pylon tip
m Pylon
S Station
s Running rail
t, $t_{vmin}$, ... Time, time interval, duration
U Voltage, voltage value

The invention claimed is:

1. A cable car system comprising:
cable car cabins that are conveyable by a conveying cable between two stations along a transport length for at least one of passenger and freight transport, wherein at least one of the cable car cabins includes electrical consumers that are operable independently by a rechargeable electrical energy store of the at least one cable car cabin;
wherein the electrical energy store is rechargeable during a dwelling time inside a station by a charging station of the cable car system;
wherein the at least one cable car cabin includes an operating control device that is connected with the energy store that includes a measurement device to dynamically capture measurement values based on an available quantity of energy of the energy store;
wherein the operating control device includes a storage module with at least one stored measurement control value and a control parameter associated therewith;
wherein the electrical consumers are connected each via one of multiple power circuits with the energy store;
wherein the operating control device includes a filter module to compare one of the captured measurement values with the at least one stored measurement control value, and to select one or more corresponding stored control parameters based upon which power circuits are selectively coupled to the energy store or selectively decoupled from the energy store by the operating control device when the at least one cable car cabin is between or inside the stations.

2. A cable car system according to claim 1, wherein at least one measurement control value and one corresponding control parameter are associated with prioritizing coupling to each power circuit and are stored by the storage module, and wherein based on the captured measurement value each power circuit is, corresponding to its prioritization, selectively coupled with the energy store or selectively decoupled from the energy store by the operating control device.

3. A cable car system according to claim 1, wherein the power circuits are selectively separated from the electrical energy store by the operating control device when the captured measurement value has fallen below a definable switch-off voltage value.

4. A cable car system according to claim 1, wherein powers circuits are selectively connected with the electrical energy store by the operating control device when the captured measurement value has exceeded a definable switch-on voltage value.

5. A cable car system according to claim 1, wherein a sensor of the at least one cable car cabin is available for location-specific determination of coordinate data based upon which all power circuits are decoupled from the energy storage by the operating control device to park the at least one cable car cabin.

6. A cable car system according to claim 1, wherein the operating control device is realized by at least one voltage converter that connects one or multiple power circuits with the energy store.

7. A cable car system according to claim 1, wherein the rechargeable energy store includes at least one double layer capacitor to feed multiple power circuits.

8. A cable car system according to claim 1, wherein a selectively decoupled power circuit is selectively coupled with the energy store during the charging by the operating control device.

9. A method for operational control of power circuits of conveyable cable car cabins of a cable car system that are conveyable by a conveying cable between stations along a transport length fed by electrical energy stores, comprising:
supplying electrical consumers with energy by the power circuits,
wherein each cable car cabin of the cable car system includes an operating control device that is connected with an energy store, and
by the operating control device and based on available residual energy of the energy store, selectively separating power circuits of at least one cable car cabin from the energy store or connecting the power circuits with the energy store when the at least one cable car cabin is between or inside the stations.

10. A method according to claim 9, including dynamically capturing an available quantity of energy of the energy store as a measurement value by a measurement device of the operating control device, and by a filter module of the operating control device comparing the captured measurement value with a stored measurement control value stored by a storage module of the operating control device, and generating an associated control parameter based upon which the operating control device selectively separates power circuits from the energy store or connects the power circuits with the energy store.

11. A cable car system comprising:
cable car cabins for passenger and freight transport that are conveyable by a conveying cable between two stations along a transport length that includes a rechargeable energy store;
wherein one or each station of the cable car system includes a charging station configured to electrically recharge energy stores that are connected with an energy store of a cable car cabin for the electrical charging action, and
wherein a sensor is configured to detect the cable car cabin and to generate a sensor signal involving measurement values captured by a measurement device of the energy store of the cable car cabin which are compared by a filter module of an operating control device of the cable car cabin to at least one measurement control value stored in a storage module of the operating control device of the cable car cabin, based upon which sensor signal a parameterizable charging current of the charging station is activated or the parameterizable charging current of the charging station is deactivated.

12. A method for charging a rechargeable electrical energy store of a cable car cabin configured to convey at least one of passengers and freight of a cable car system which is conveyed by a conveying cable between at least two stations along a transport length, comprising:
　electrically charging the rechargeable electrical energy store of the cable car cabin during at least a temporary dwelling time of the cable car cabin inside a station of the cable car system, and
　activating or deactivating a parameterizable charging current of the station by a sensor of the cable car system.

13. A method according to claim 12, including electrically charging the electrical energy store of the cable car cabin during at least a temporary passage or the dwelling time of the transportation operating equipment relative to cable pylons of the cable car system.

14. A method according to claim 12, including electrically connecting the energy store with two current consumers, and wherein each current consumer acts in conjunction with respectively one contact provided inside a charging station to charge the energy store inside a station of the cable car system, and activating or deactivating the parameterizable charging current of the charging station by the sensor.

\* \* \* \* \*